US012112710B2

(12) United States Patent
Kojima et al.

(10) Patent No.: US 12,112,710 B2
(45) Date of Patent: Oct. 8, 2024

(54) DISPLAY DRIVER AND DISPLAY DEVICE

(71) Applicant: LAPIS Technology Co., Ltd., Yokohama (JP)

(72) Inventors: Fumiya Kojima, Yokohama (JP); Young Gi Kim, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/451,853

(22) Filed: Aug. 18, 2023

(65) Prior Publication Data

US 2024/0071318 A1 Feb. 29, 2024

(30) Foreign Application Priority Data

Aug. 31, 2022 (JP) ................................ 2022-138000

(51) Int. Cl.
*G09G 3/3275* (2016.01)

(52) U.S. Cl.
CPC ... *G09G 3/3275* (2013.01); *G09G 2300/0828* (2013.01); *G09G 2320/0276* (2013.01); *G09G 2330/021* (2013.01); *G09G 2330/028* (2013.01)

(58) Field of Classification Search
CPC ......... G09G 3/3275; G09G 2300/0828; G09G 2320/0276; G09G 2330/021; G09G 2330/028; G09G 3/20; G09G 2310/027; G09G 2310/0291; G09G 2320/0233; G09G 2320/0673; G09G 3/3696
See application file for complete search history.

(56) References Cited

U.S. PATENT DOCUMENTS

2002/0186230 A1* 12/2002 Kudo .................. G09G 3/3607 345/690
2003/0151616 A1* 8/2003 Morita ................ G09G 3/3696 345/690
2007/0001973 A1* 1/2007 Kumagai ............ G09G 3/3611 345/98
2009/0033685 A1* 2/2009 Park ..................... G09G 3/3233 345/601
2009/0189924 A1* 7/2009 Ogura .................. G09G 3/3233 345/690

(Continued)

FOREIGN PATENT DOCUMENTS

JP 2005148679 6/2005

*Primary Examiner* — Ibrahim A Khan
(74) *Attorney, Agent, or Firm* — JCIPRNET

(57) ABSTRACT

A display driver and a display device are provided. The driver includes a first ladder resistor receiving a first potential at one end and a higher second potential at the other end to generate voltages obtained by dividing a voltage between first and second potentials; a second ladder resistor receiving first potential at one end, a second potential at the other end, and each of partial voltages among the voltages generated by the first ladder resistor at a connection point between the resistors to generate gradation reference voltages; first to k-th input amplifiers individually amplifying first to k-th DC bottom potentials respectively corresponding to first to k-th gamma correction characteristics to generate first to k-th amplified bottom potentials; and a first selector sequentially selecting one of the first to k-th amplified bottom potentials and supplying the selected one to one end of the first ladder resistor as a first potential.

11 Claims, 13 Drawing Sheets

(56) References Cited

U.S. PATENT DOCUMENTS

| | | | | |
|---|---|---|---|---|
| 2011/0316893 | A1* | 12/2011 | Lee | G09G 3/3208 345/77 |
| 2014/0085349 | A1* | 3/2014 | Shiibayashi | G09G 3/3614 345/690 |
| 2015/0049073 | A1* | 2/2015 | Morita | G09G 3/3688 345/211 |
| 2017/0358277 | A1* | 12/2017 | Yamazaki | G09G 3/3688 |
| 2019/0156756 | A1* | 5/2019 | Aizawa | G09G 3/3258 |
| 2020/0135119 | A1* | 4/2020 | Nakayama | G09G 3/2007 |

* cited by examiner

DISPLAY DRIVER AND DISPLAY DEVICE

CROSS-REFERENCE TO RELATED APPLICATIONS

This application claims the priority benefits of Japanese application no. 2022-138000, filed on Aug. 31, 2022. The entirety of the above-mentioned patent application is hereby incorporated by reference herein and made a part of this specification.

BACKGROUND

Technical Field

The disclosure relates to a display driver that drives a display panel according to a video signal and a display device.

Description of Related Art

As a liquid crystal or organic EL display device, there is known one including a display panel in which a display cell is formed at each intersection of a plurality of scanning lines and a plurality of signal lines (hereinafter, referred to as data lines) and a display driver which drives the plurality of data lines of the display panel.

The display driver includes a DA conversion unit which converts a pixel data piece representing a luminance level of each pixel based on a video signal into a gradation voltage having a voltage value corresponding to the luminance level and a plurality of output amplifiers which supplies a drive voltage obtained by amplifying each of the plurality of gradation voltages to the plurality of data line of the display driver.

The DA conversion unit is composed of a plurality of DA conversion circuits provided to correspond to each data line.

Here, a ladder resistor type circuit is proposed as each of the DA conversion circuits included in the DA conversion unit of the display driver (for example, see Patent Document 1).

In the DA conversion circuit described in Patent Document 1, a voltage corresponding to the luminance level represented by the pixel data piece is selected from a plurality of voltages (referred to as reference voltages) output from a plurality of taps of the ladder resistor and the voltage is output as the gradation voltage.

At this time, each DA conversion circuit needs to generate a gradation voltage having a voltage value along gamma characteristics corresponding to each color (red, green, and blue) assigned to a display cell.

Here, in the DA conversion unit described in Patent Document 1, a maximum reference voltage (Vref-R) in the plurality of reference voltages along the gamma characteristic of red is applied to one end of the ladder resistor included in each corresponding DA conversion circuit. Similarly, a maximum reference voltage (Vref-G) in the plurality of reference voltages along the gamma characteristic of green is applied to one end of the ladder resistor included in each corresponding DA conversion circuit. Further, a maximum reference voltage (Vref-B) in the plurality of reference voltages along the gamma characteristic of blue is applied to one end of the ladder resistor included in each corresponding DA conversion circuit.

Incidentally, in order to individually supply the generated reference voltages (Vref-R), (Vref-G), and (Vref-B) to the DA conversion circuit group, three systems of drivers corresponding to each of them are required and hence the device scale increases.

Here, Patent Document 1 employs a configuration in which a switch (35) for sequentially switching the generated reference voltages (Vref-R), (Vref-G), and (Vref-B) in a horizontal scanning period is provided and the output of the switch is supplied to one end of each ladder resistor of all DA conversion circuits via one wiring (FIG. 15).

PATENT DOCUMENTS

[Patent Document 1] Japanese Patent Laid-Open No. 2005-148679

As shown in FIG. 15 of Patent Document 1, in fact, an amplifier needs to be provided between the output of the switch (35) and the single wiring in order to supply the output of the switch (35) to all DA conversion circuits via a single wiring.

However, a delay time obtained by adding a response delay of the amplifier to an element delay of the switch (35) is required until the output of the amplifier is stabilized after the reference voltage of the switch (35) is switched. Thus, since the slew rate of the amplifier needs to be increased in order to cope with the recent large screen and high-definition display, a problem arises in that power consumption increases.

Here, the disclosure provides a display driver capable of reducing power consumption and a display device including the display driver.

SUMMARY

A display driver according to an embodiment of the disclosure is a display driver for driving a display panel having a plurality of display cells respectively connected to a plurality of data lines based on a plurality of pixel data pieces representing a luminance level represented by a video signal, including: a gradation reference voltage generator which generates a plurality of gradation reference voltages along first to k-th (k is an integer of 2 or more) gamma correction characteristics for different color components; and a DA conversion unit which selects a gradation reference voltage corresponding to a luminance level represented by the pixel data piece from the plurality of gradation reference voltages for each of the plurality of pixel data pieces and outputs the gradation reference voltage as a gradation voltage, wherein the gradation reference voltage generator includes a first ladder resistor which receives a first potential at one end and receives a second potential higher than the first potential at the other end to generate a plurality of voltages obtained by dividing a voltage between the first potential and the second potential, a second ladder resistor which receives the first potential at one end, receives the second potential at the other end, and receives each of a plurality of partial voltages among the plurality of voltages at a connection point between the resistors to generate the plurality of gradation reference voltages, first to k-th input amplifiers which receive first to k-th DC bottom potentials respectively corresponding to the first to k-th gamma correction characteristics, individually amplify the first to k-th DC bottom potentials, and output first to k-th amplified bottom potentials, and a first selector which receives the first to k-th amplified bottom potentials, sequentially selects one amplified bottom potential among the first to k-th amplified bottom potentials, and supplies the one selected amplified bottom potential to the one end of the first ladder resistor as the first potential.

Further, a display device according to an embodiment of the disclosure is a display device including: a display panel in which a plurality of display cells are respectively connected to a plurality of data lines; and a display driver which drives the display panel based on a plurality of pixel data pieces representing a luminance level represented by a video signal, wherein the display driver includes a gradation reference voltage generator which generates a plurality of gradation reference voltages along first to k-th (k is an integer of 2 or more) gamma correction characteristics for different color components and a DA conversion unit which selects a gradation reference voltage corresponding to a luminance level represented by the pixel data piece from the plurality of gradation reference voltages for each of the plurality of pixel data pieces and outputs the gradation reference voltage as a gradation voltage, and wherein the gradation reference voltage generator includes a first ladder resistor which receives a first potential at one end and receives a second potential higher than the first potential at the other end to generate a plurality of voltages obtained by dividing a voltage between the first potential and the second potential, a second ladder resistor which receives the first potential at one end, receives the second potential at the other end, and receives each of a plurality of partial voltages among the plurality of voltages at a connection point between the resistors to generate the plurality of gradation reference voltages, first to k-th input amplifiers which receive first to k-th DC bottom potentials respectively corresponding to the first to k-th gamma correction characteristics, individually amplify the first to k-th DC bottom potentials, and output first to k-th amplified bottom potentials, and a first selector which receives the first to k-th amplified bottom potentials, sequentially selects one amplified bottom potential among the first to k-th amplified bottom potentials, and supplies the one selected amplified bottom potential to the one end of the first ladder resistor as the first potential.

DESCRIPTION OF THE EMBODIMENTS

In an embodiment of the disclosure, the gamma correction characteristic is switched by changing the value of the first potential to the following value when generating the plurality of gradation reference voltages for DA conversion by applying the first potential to one end of the ladder resistor and applying the second potential higher than the first potential to the other end of the ladder resistor.

That is, the plurality of amplified bottom potentials obtained by amplifying the plurality of DC bottom potentials respectively corresponding to the color components by the plurality of input amplifiers are supplied to the selector. The selector sequentially selects one of the plurality of amplified bottom potentials and supplies the one selected amplified bottom potential to one end of the ladder resistor as the first potential.

At this time, the DC bottom potential corresponding to each color component input to each input amplifier is constant. Thus, since the response delay of each input amplifier is substantially zero, the delay time required from the start of switching of the selector to stabilization of the value of the potential output from the selector is only the element delay of the selector.

Thus, high-speed response becomes possible compared to a configuration in which the input amplifier is required at the rear stage of the selector, that is, a delay time obtained by adding the response delay of the amplifier to the element delay of the selector is required until the output of the input amplifier is stabilized after the start of switching of the selector.

Thus, according to the disclosure, it is possible to reduce power consumption without causing image quality deterioration by suppressing the slew rate of the input amplifier.

Hereinafter, embodiments of the disclosure will be described in detail with reference to the drawings.

First Embodiment

Figure 1:
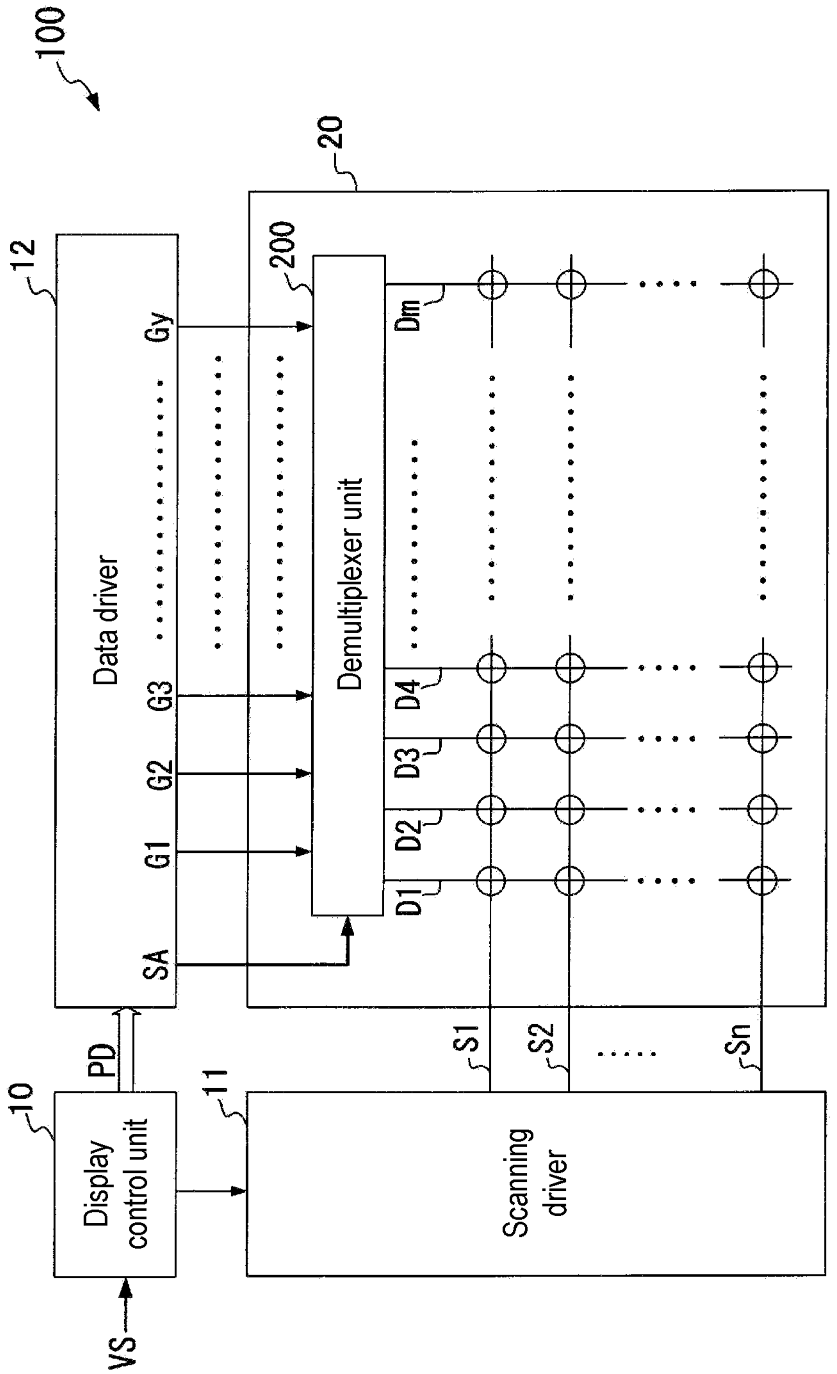
FIG. 1 is a block diagram showing a configuration of a display device 100 including a display driver according to the disclosure.

FIG. 1 is a block diagram showing a configuration of a display device 100 including a display driver according to the disclosure. As shown in FIG. 1, the display device 100 includes a display control unit 10, a scanning driver 11, a data driver 12, and a display panel 20.

The display control unit 10 receives a video signal VS including a horizontal synchronizing signal and representing the luminance level of each pixel for each of red, green and blue color components. The display control unit 10 generates a scanning signal according to the horizontal synchronizing signal included in the video signal VS and supplies the scanning signal to the scanning driver 11. Further, the display control unit 10 supplies a video data signal PD including a series of pixel data pieces representing the luminance level of each of red, green, and blue with, for example, 8 bits to the data driver 12 based on the video signal VS.

The scanning driver 11 generates scanning pulses according to scanning signals supplied from the display control unit 10 and sequentially and alternatively applies them to horizontal scanning lines S1 to Sn formed on the display panel 20.

The data driver 12 is formed on a single or multiple semiconductor ICs. The data driver 12 converts each of the pixel data pieces included in the video data signal PD into drive signals G1 to Gy (y is an integer of 2 or more and m/2 or less) having a voltage value corresponding to the luminance level based on the video data signal PD and outputs each drive signal to the display panel 20.

Furthermore, the data driver 12 generates a gamma characteristic switching signal SA for instructing switching of gamma correction characteristics within each period obtained by dividing the horizontal scanning period into two or three based on the horizontal synchronizing signal included in the video data signal PD and outputs the gamma characteristic switching signal to the display panel 20 for each horizontal scanning period.

The display panel 20 is an organic EL display panel having a pentile arrangement or a liquid crystal display panel having an RGB stripe arrangement.

The display panel 20 includes a demultiplexer unit 200, n number of (n is an integer of 2 or more) horizontal scanning lines S1 to Sn extending in the horizontal direction of the two-dimensional screen and m number of (m is an integer of 2 or more) data lines D1 to Dm extending in the vertical direction of the two-dimensional screen. For example, display cells for each color component required for displaying color such as a red display cell for displaying red, a green display cell for displaying green, and a blue display cell for displaying blue are formed in the area (circled area) of the intersection of the horizontal scanning lines and the data lines.

The demultiplexer unit 200 receives the drive signals G1 to Gy and the gamma characteristic switching signal SA output from the data driver 12. The demultiplexer unit 200 supplies the drive signals G1 to Gy output from the data driver 12 to y number of data lines among the data lines D1 to Dm based on the gamma characteristic switching signal SA. For example, when the gamma characteristic switching signal SA represents the first half period of the horizontal scanning period, the demultiplexer unit 200 supplies the drive signals G1 to Gy to each of the odd-numbered data lines among the data lines D1 to Dm. On the other hand, when the gamma characteristic switching signal SA represents the second half period of the horizontal scanning period, the drive signals G1 to Gy are supplied to each of the even-numbered data lines among the data lines D1 to Dm.

Figure 2:
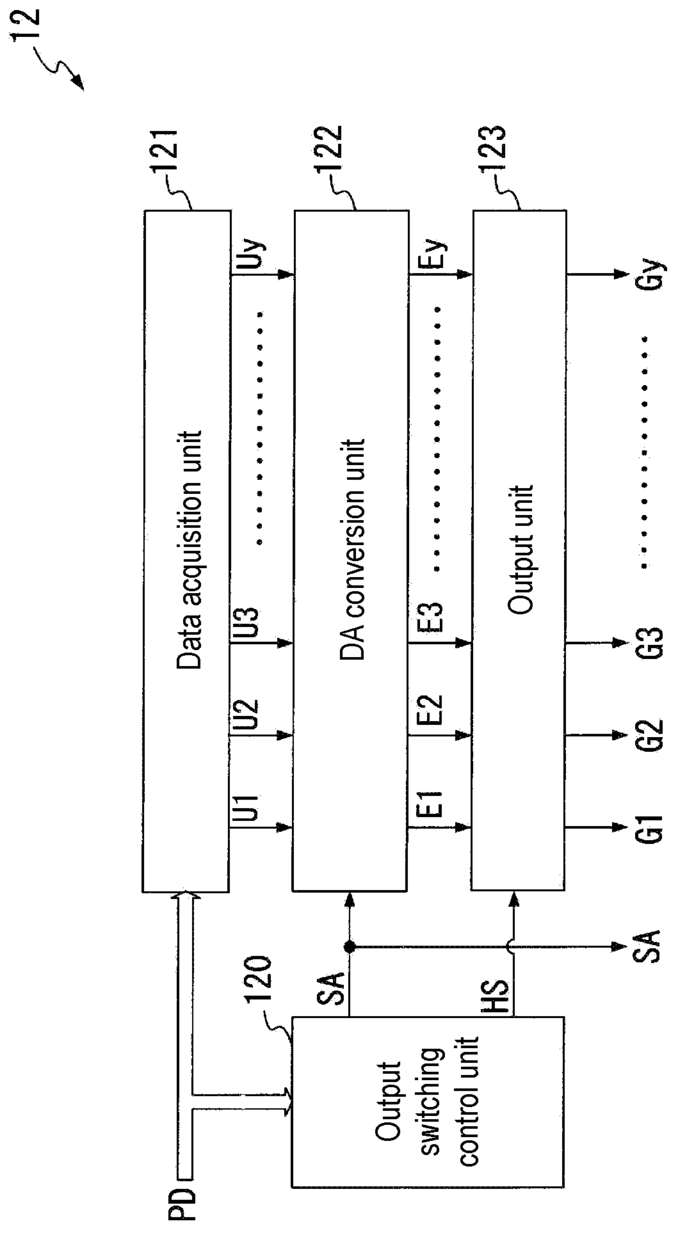
FIG. 2 is a block diagram showing an internal configuration of a data driver 12.

FIG. 2 is a block diagram showing an example of an internal configuration of the data driver 12.

As shown in FIG. 2, the data driver 12 includes an output switching control unit 120, a data acquisition unit 121, a DA conversion unit 122, and an output unit 123.

The output switching control unit 120 generates the gamma characteristic switching signal SA that represents whether the period is the first half period or the second half period in the horizontal scanning period for each horizontal scanning period based on the horizontal synchronizing signal included in the video signal VS. Then, the output switching control unit 120 supplies the gamma characteristic switching signal SA to the DA conversion unit 122 and outputs the gamma characteristic switching signal to the display panel 20 (demultiplexer unit 200). Furthermore, the output switching control unit 120 generates a horizontal scanning switching signal HS that alternately switches between logic levels 1 and 0 every horizontal scanning period based on the horizontal synchronizing signal and supplies the horizontal scanning switching signal to the output unit 123.

The data acquisition unit 121 receives the video data signal PD and acquires a series of pixel data pieces included in the video data signal PD. The data acquisition unit 121 supplies y (y is an integer of 2 or more and m/2 or less) number of the acquired pixel data pieces to the DA conversion unit 122 as pixel data U1 to Uy for each horizontal scanning period.

The DA conversion unit 122 converts each of the pixel data U1 to Uy into gradation voltages E1 to Ey having a luminance level represented by the pixel data and a voltage value along the gamma correction characteristic for each color (red, green, blue) and supplies each of them to the output unit 123. At this time, the DA conversion unit 122 switches the gamma correction characteristic for each period obtained by dividing each horizontal scanning period into two or three based on the gamma characteristic switching signal SA.

The output unit 123 outputs a signal group obtained by individually amplifying the gradation voltages E1 to Ey supplied from the DA conversion unit 122 as drive signals G1 to Gy. In addition, the output unit 123 changes the correspondence relationship between the gradation voltages E1 to Ey and the drive signals G1 to Gy based on the horizontal scanning switching signal HS. For example, in the output unit 123, the drive signals G1 to Gy are obtained by amplifying the gradation voltages E1 to Ey while the horizontal scanning switching signal HS represents the logic level 0. On the other hand, the odd-numbered gradation voltages E1, E3, E5, . . . among the gradation voltages E1 to Ey become the even-numbered drive signals G2, G4, G6, . . . among the drive signals G1 to Gy and the even-numbered gradation voltages E2, E4, E6, . . . become the odd-numbered drive signals G1, G3, G5, . . . while the horizontal scanning switching signal HS represents the logic level 1.

Figure 3:
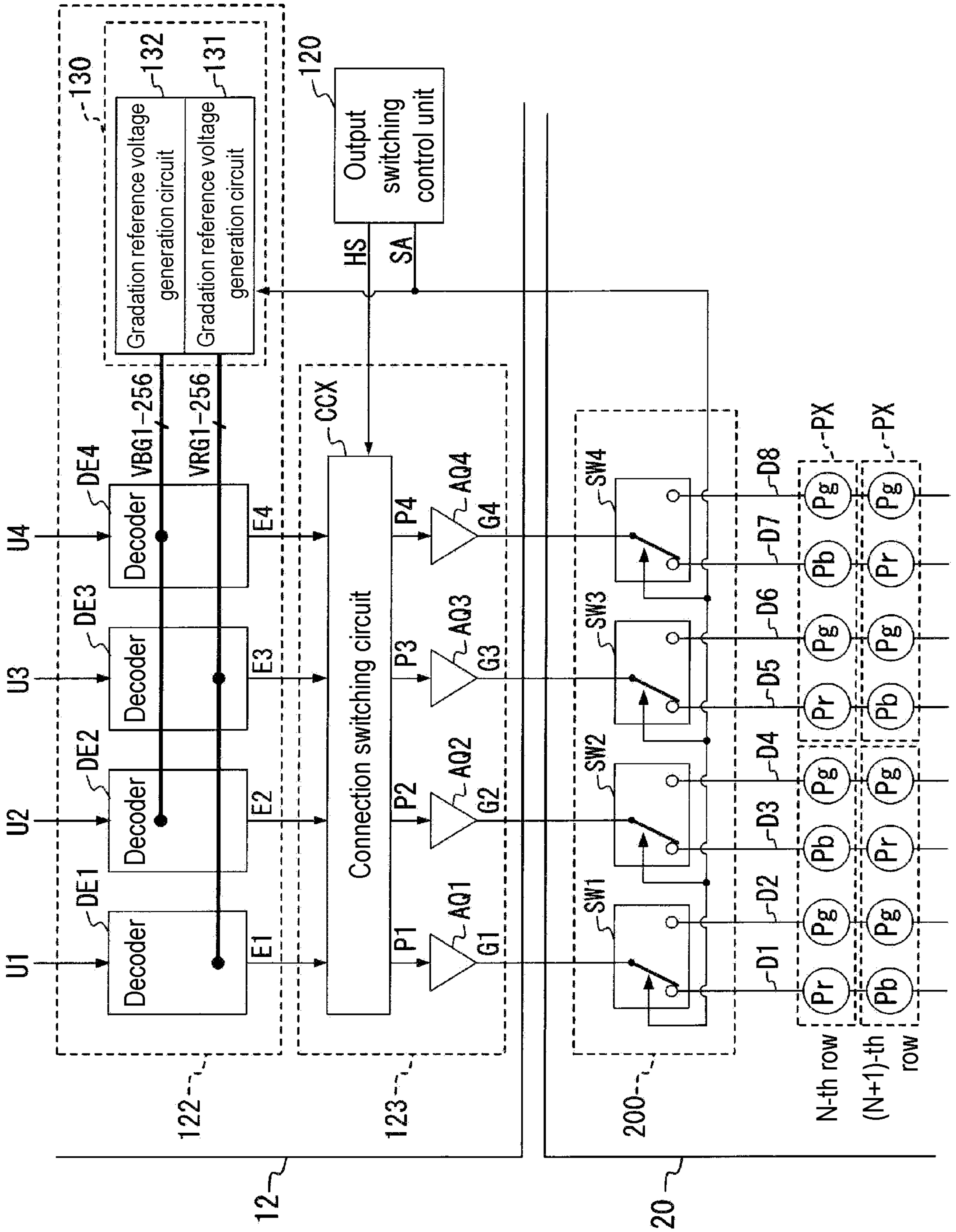
FIG. 3 is a block diagram showing circuit blocks related to drive signals G1 to G4 extracted from each of a display panel 20 and the data driver 12.

FIG. 3 is a block diagram showing a part of an internal configuration of the data driver 12 when the display panel 20 is an organic EL display panel having a pentile arrangement.

In FIG. 3, only the configuration related to four output channels corresponding to G1 to G4 out of the drive signals G1 to Gy of the data driver 12 is extracted and shown.

As shown in FIG. 3, the DA conversion unit 122 includes four decoders DE1 to DE4 having a minimum group configuration in the pentile arrangement and a gradation reference voltage generator 130. Additionally, in FIG. 3, for convenience of drawing, only those related to the minimum group configuration are shown as the internal configurations of the DA conversion unit 122, the output unit 123, and the demultiplexer unit 200, but in fact, the minimum group configuration is extended to an integral multiple except for the output switching control unit 120 and the gradation reference voltage generator 130.

The gradation reference voltage generator 130 includes the gradation reference voltage generation circuits 131 and 132 which receive the gamma characteristic switching signal SA supplied from the output switching control unit 120.

The gradation reference voltage generation circuit 131 generates one of a gradation reference voltage group for 256 grayscales having voltage values along the gamma correction characteristic of red and a gradation reference voltage group for 256 grayscales having voltage values along the gamma correction characteristic of green according to the gamma characteristic switching signal SA. Then, the gradation reference voltage generation circuit 131 supplies the generated gradation reference voltage group to the odd-numbered decoders DE1 and DE3 among the decoders DE1 to DE4 as gradation reference voltages VRG1 to VRG256.

The gradation reference voltage generation circuit 132 generates one of a gradation reference voltage group for 256 grayscales having voltage values along the gamma correction characteristic of blue and a gradation reference voltage group for 256 grayscales having voltage values along the gamma correction characteristic of green according to the gamma characteristic switching signal SA. Then, the gradation reference voltage generation circuit 132 supplies the generated gradation reference voltage group to the even-numbered decoders DE2 and DE4 among the decoders DE1 to DE4 as gradation reference voltages VBG1 to VBG256.

The decoder DE1 (DE3) selects a gradation reference voltage corresponding to the luminance level represented by the pixel data U1 (U3) out of the gradation reference voltages VRG1 to VRG256 and supplies the gradation reference voltage to the output unit 123 as the gradation voltage E1 (E3). The decoder DE2 (DE4) selects a gradation reference voltage corresponding to the luminance level represented by the pixel data U2 (U4) out of the gradation reference voltages VBG1 to VBG256 and supplies the gradation reference voltage to the output unit 123 as the gradation voltage E2 (E4).

The output unit 123 includes a connection switching circuit CCX and amplifiers AQ1 to AQ4.

The connection switching circuit CCX respectively supplies the gradation voltages E1 to E4 to the amplifiers AQ1 to AQ4 as gradation voltages P1 to P4 in the following correspondence relationship while the horizontal scanning switching signal HS supplied from the output switching control unit 120 represents, for example, the logic level 0.

E1: P1
E2: P2
E3: P3
E4: P4

On the other hand, the connection switching circuit CCX respectively supplies the gradation voltages E1 to E4 to the amplifiers AQ1 to AQ4 as the gradation voltages P1 to P4 in the following correspondence relationship while the horizontal scanning switching signal HS represents, for example, the logic level 1.

E1: P2
E2: P1
E3: P4
E4: P3

The amplifiers AQ1 to AQ4 receive the gradation voltages P1 to P4 and output the individually amplified signals to the display panel 20 as the drive signals G1 to G4, respectively.

As shown in FIG. 3, the demultiplexer unit 200 included in the display panel 20 includes switches SW1 to SW4 that individually receive the gamma characteristic switching signal SA and the drive signals G1 to G4 output from the data driver 12.

The switches SW1 to SW4 respectively supply the drive signals G1 to G4 to the odd-numbered data lines D1, D3, D5, and D7 of the display panel 20 when the gamma characteristic switching signal SA represents, for example, the first half period when the horizontal scanning period is divided into the first half period and the second half period. On the other hand, the drive signals G1 to G4 are respectively supplied to the even-numbered data lines D2, D4, D6, and D8 of the display panel 20 when the gamma characteristic switching signal SA represents the second half period of the horizontal scanning period.

In addition, since the display panel 20 is a pentile type organic EL display panel, a cell group PX consisting of four display cells arranged side by side in the order of a red display cell Pr, a green display cell Pg, a blue display cell Pb, and a green display cell Pg on the N-th-row (N is an integer of 2 or more) horizontal scanning line intersecting each data line constitutes one color pixel as shown in FIG. 3. On the other hand, the cell group PX consisting of four display cells arranged side by side in the order of the blue display cell Pb, the green display cell Pg, the red display cell Pr, and the green display cell Pg on the (N+1)-th-row horizontal scanning line constitutes one color pixel.

Thus, with the configuration shown in FIG. 3, in the first half period in the (N)-th horizontal scanning period, the drive signal G1 having the gradation voltage E1 along the gamma correction characteristic of the red component, the drive signal G2 having the gradation voltage E2 along the gamma correction characteristic of the blue component, the drive signal G3 having the gradation voltage E3 along the gamma correction characteristic of the red component, and the drive signal G4 having the gradation voltage E4 along the gamma correction characteristic of the blue component are respectively supplied to the (N)-th-row red, blue, red, and blue display cells Pr, Pb, Pr, and Pb via the data lines D1, D3, D5, and D7.

Further, in the second half period in the (N)-th horizontal scanning period, the drive signal G1 having the gradation voltage E2 along the gamma correction characteristic of the green component, the drive signal G2 having the gradation voltage E1 along the gamma correction characteristic of the green component, the drive signal G3 having the gradation voltage E4 along the gamma correction characteristic of the green component, and the drive signal G4 having the gradation voltage E3 along the gamma correction characteristic of the green component are respectively supplied to the (N)-th-row green display cells Pg, Pg, Pg, and Pg via the data lines D2, D4, D6, and D8.

Further, in the first half period in the (N+1)-th horizontal scanning period, the drive signal G1 having the gradation voltage E2 along the gamma correction characteristic of the blue component, the drive signal G2 having the gradation voltage E1 along the gamma correction characteristic of the red component, the drive signal G3 having the gradation voltage E4 along the gamma correction characteristic of the blue component, and the drive signal G4 having the gradation voltage E3 along the gamma correction characteristic of the red component are respectively supplied to the (N+1)-th-row blue, red, blue, and red display cells Pb, Pr, Pb, and Pr via the data lines D1, D3, D6, and D8.

Further, in the second half period in the (N+1)-th horizontal scanning period, the drive signal G1 having the gradation voltage E1 along the gamma correction characteristic of the green component, the drive signal G2 having the gradation voltage E2 along the gamma correction characteristic of the green component, the drive signal G3 having the gradation voltage E3 along the gamma correction characteristic of the green component, and the drive signal G4 having the gradation voltage E4 along the gamma correction characteristic of the green component are respectively supplied to the (N+1)-th-row green display cells Pg, Pg, Pg, and Pg via the data lines D2, D4, D6, and D8.

Here, the gradation reference voltage generation circuits 131 and 132 of the gradation reference voltage generator 130 shown in FIG. 3 are configured to switch the gamma correction characteristic in the first half period and the second half period in the horizontal scanning period as described above according to the gamma characteristic switching signal SA.

Figure 4A:
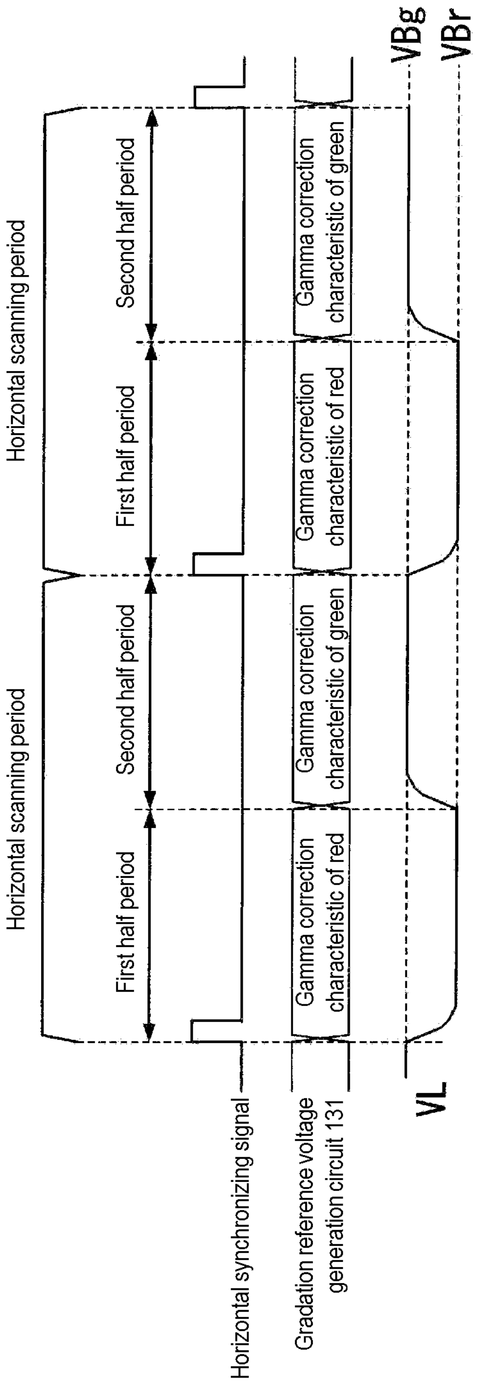
FIG. 4A is a time chart showing a switching operation of gamma correction characteristics in a gradation reference voltage generation circuit 131.

That is, the gradation reference voltage generation circuit 131 generates the gradation reference voltages VRG1 to VRG256 along the gamma correction characteristic of red during the first half period when each horizontal scanning period is divided into the first half period and the second half period as shown in FIG. 4A. On the other hand, the gradation reference voltage generation circuit 131 generates the gradation reference voltages VRG1 to VRG256 along the gamma correction characteristic of green during the second half period.

Figure 4B:
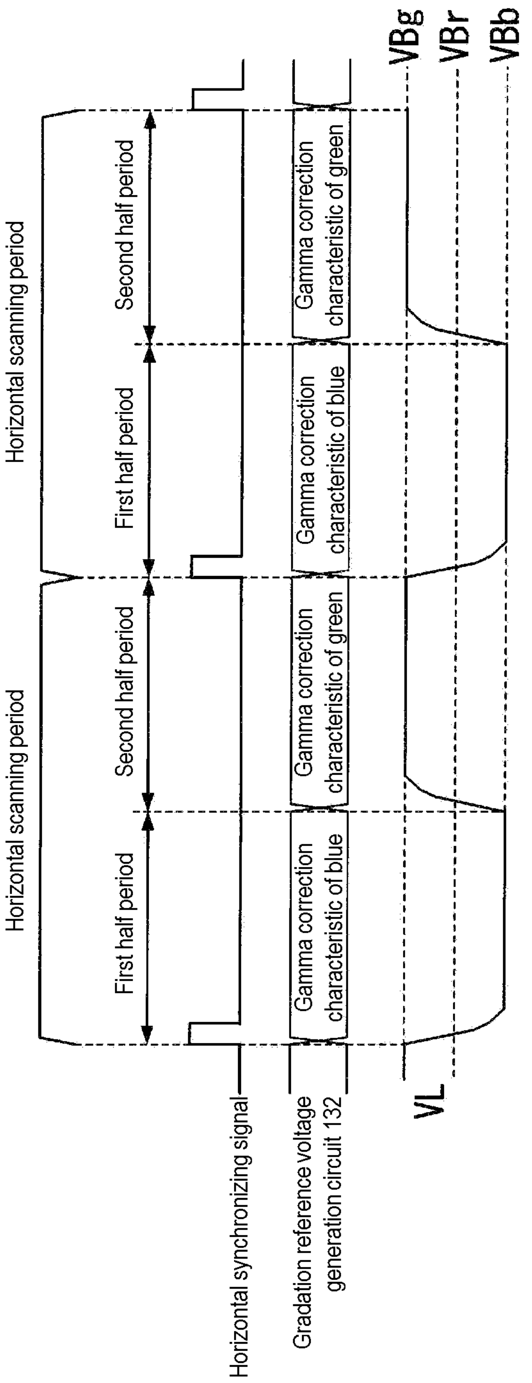
FIG. 4B is a time chart showing a switching operation of gamma correction characteristics in a gradation reference voltage generation circuit 132.

As shown in FIG. 4B, the gradation reference voltage generation circuit 132 generates the gradation reference voltages VBG1 to VBG256 along the gamma correction characteristic of blue during the first half period within each horizontal scanning period and generates the gradation reference voltages VBG1 to VBG256 along the gamma correction characteristic of green during the second half period.

Figure 5:
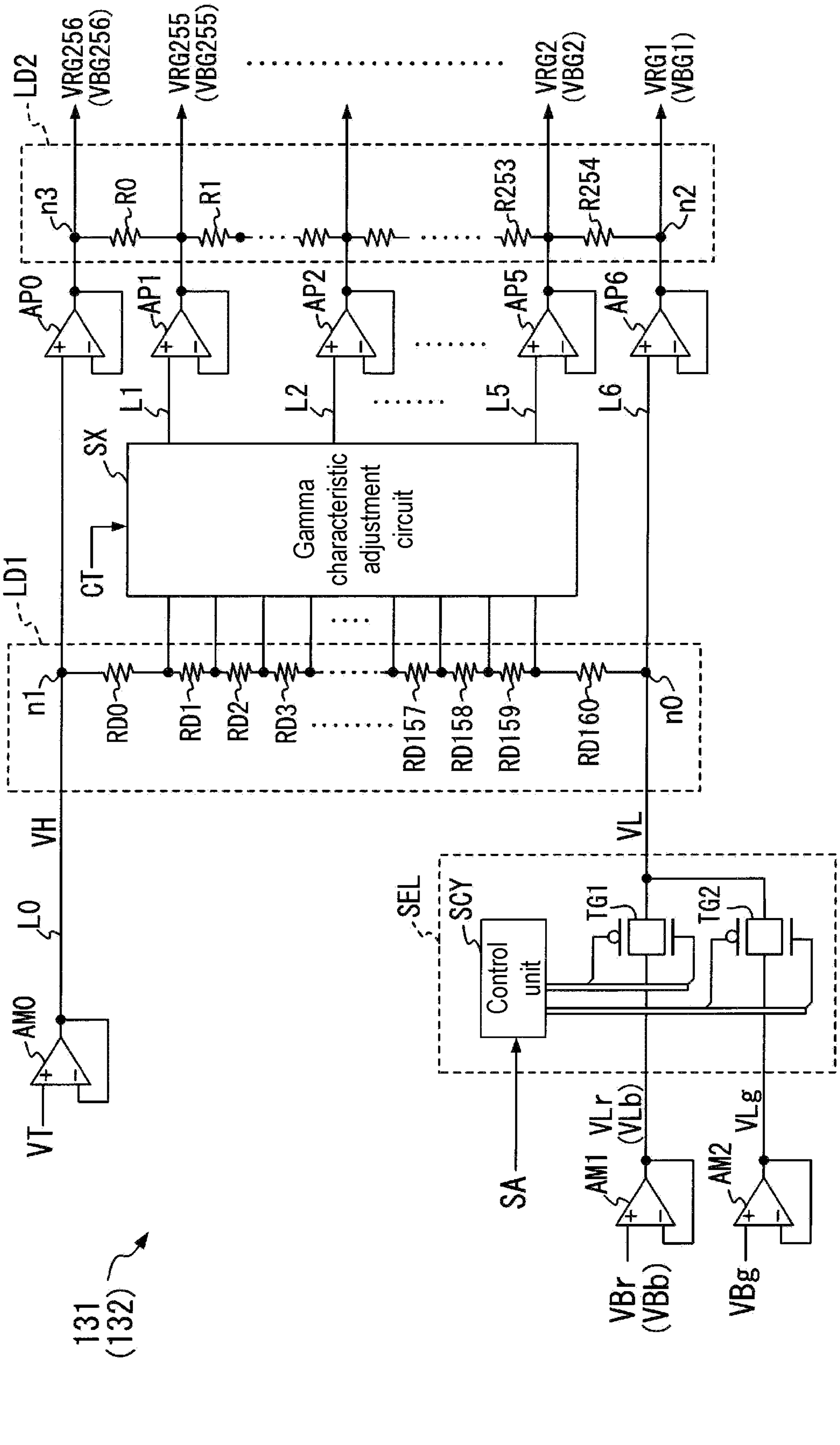
FIG. 5 is a circuit diagram showing an example of an internal configuration of the gradation reference voltage generation circuit 131 (132).

FIG. 5 is a circuit diagram showing a configuration of the gradation reference voltage generation circuit 131 (132).

As shown in FIG. 5, the gradation reference voltage generation circuit 131 (132) includes a selector SEL, a gamma characteristic adjustment circuit SX, ladder resistors LD1 and LD2, input amplifiers AM0 to AM2, and output amplifiers AP0 to AP6 and each amplifier is a voltage follower operational amplifier.

The input amplifier AM0 receives a DC top potential VT having the highest potential in the gradation reference voltage and supplies a potential obtained by amplifying the DC top potential VT to the ladder resistor LD1 and the input terminal of the output amplifier AP0 via the line L0 as a top potential VH.

The ladder resistor LD1 includes resistors RD0 to RD160 which are connected in series. At this time, the resistor RD160 connected to the last end of the resistors RD0 to RD160 connected in series is connected to one end n0 of the ladder resistor LD1 and the leading resistor RD0 is connected to the other end n1 of the ladder resistor LD1. Further, one end n0 of the ladder resistor LD1 is connected to the line L6 and the other end n1 is connected to the line L0. With such a configuration, the ladder resistor LD1 generates 160 voltages obtained by dividing the voltage between top potential VH applied to the line L0 and the bottom potential VL applied to the line L6 and supplies 160 voltages to the gamma characteristic adjustment circuit SX.

The input amplifier AM1, especially, the input amplifier AM1 of the gradation reference voltage generation circuit 131 receives a DC bottom potential VBr for red having the lowest potential along the gamma correction characteristic of red. Then, the input amplifier AM1 of the gradation reference voltage generation circuit 131 supplies a potential obtained by amplifying the DC bottom potential VBr for red to the selector SEL as an amplified bottom potential VLr. The input amplifier AM1 of the gradation reference voltage generation circuit 132 receives a DC bottom potential VBb for blue having the lowest potential along the gamma correction characteristic of blue. Then, the input amplifier AM1 of the gradation reference voltage generation circuit 132 supplies a potential obtained by amplifying the DC bottom potential VBb for blue to the selector SEL as an amplified bottom potential VLb.

The input amplifier AM2 receives a DC bottom potential VBg for green having the lowest potential along the gamma correction characteristic of green. Then, the input amplifier AM2 supplies a potential obtained by amplifying the DC bottom potential VBg for green to the selector SEL as an amplified bottom potential VLg.

The selector SEL includes a control unit SCY and transmission gates TG1 and TG2.

When the transmission gate TG1 receives the amplified bottom potential VLr (VLb) and is set to be in the on state by the control unit SCY, the amplified bottom potential VLr (VLb) is output to the line L6 as the bottom potential VL. When the transmission gate TG2 receives the amplified bottom potential VLg and is set to be in the on state by the control unit SCY, the amplified bottom potential VLg is output to the line L6 as the bottom potential VL.

The control unit SCY receives the gamma characteristic switching signal SA and sets the transmission gate TG1 to the on state when the gamma characteristic switching signal SA represents the first half period of each horizontal scanning period and sets the transmission gate TG2 to the on state when the gamma characteristic switching signal SA represents the second half period of each horizontal scanning period.

With such a configuration, the selector SEL selects one of the amplified bottom potential VLr (or VLb) corresponding to the lowest potential along the gamma correction characteristic of red (or blue) and the amplified bottom potential VLg corresponding to the lowest potential along the gamma correction characteristic of green according to the gamma characteristic switching signal SA. Then, the selector SEL sets one selected from the amplified bottom potential VLr (or VLb) and the amplified bottom potential VLg as the bottom potential VL and supplies the selected one to one end n0 of the ladder resistor LD1 and the input terminal of the output amplifier AP6 via the line L6.

Accordingly, in the gradation reference voltage generation circuit 131, the value of the bottom potential VL applied to one end n0 of the ladder resistor LD1 becomes the DC bottom potential VBr for red in the first half period of each horizontal scanning period and becomes the DC bottom potential VBg for green in the second half period as shown in FIG. 4A.

On the other hand, in the gradation reference voltage generation circuit 132, the value of the bottom potential VL applied to the ladder resistor LD1 becomes the DC bottom potential VBb for blue in the first half period of each horizontal scanning period and becomes the DC bottom potential VBg for green in the second half period as shown in FIG. 4B.

The gamma characteristic adjustment circuit SX selects five voltages specified by a gamma adjustment signal CT from 160 voltages output from the ladder resistor LD1 and supplies each of them to the input terminal of each of the output amplifiers AP1 to AP5 via the lines L1 to L5.

The ladder resistor LD2 includes resistors R0 to R254 connected in series. At this time, the resistor R254 connected to the last end of the resistors R0 to R254 connected in series is connected to one end n2 of the ladder resistor LD2 and the leading resistor R0 is connected to the other end n3 of the ladder resistor LD2.

The output amplifier AP0 supplies the output voltage obtained by amplifying the top potential VH applied to the line L0 to the other end n3 of the ladder resistor LD2. The output amplifier AP1 supplies the output voltage obtained by amplifying the voltage of the line L1 to the connection point between the resistors R0 and R1 in the ladder resistor LD2. The output amplifiers AP2 to AP4 supply the voltages obtained by respectively amplifying the voltages of the lines L2 to L4 to the connection points between three resistors in the ladder resistor LD2. The output amplifier AP5 supplies the output voltage obtained by amplifying the voltage of the line L5 to the connection point between the resistor R253 and R254 in the ladder resistor LD2. The output amplifier AP6 supplies the output voltage obtained by amplifying the bottom potential VL applied to the line L6 to one end n2 of the ladder resistor LD2.

Accordingly, the ladder resistor LD2 receives the output voltage corresponding to the bottom potential VL output from the output amplifier AP6 by one end n2 and receives the output voltage corresponding to the top potential VH output from the output amplifier AP0 by the other end n3. Further, the ladder resistor LD2 receives each of the output voltages output from the output amplifiers AP1 to AP5 at the connection point between its own resistors. Thus, the ladder resistor LD2 of the gradation reference voltage generation circuit 131 receives the output voltages of the output amplifiers AP0 to AP6 and outputs the voltage generated at one end of each of the resistors R0 to R254 as the gradation reference voltages VRG1 to VRG256 along the gamma correction characteristic of red or green. On the other hand, the ladder resistor LD2 of the gradation reference voltage generation circuit 132 receives the output voltages of the output amplifiers AP0 to AP6 and outputs the voltage generated at one end of each of the resistors R0 to R254 as the gradation reference voltages VRG1 to VRG256 along the gamma correction characteristic of blue or green.

Incidentally, in the gradation reference voltage generator 130, two systems of the gradation reference voltage generation circuits 131 and 132 for switching the gamma correction characteristic within each horizontal scanning period are employed as below when generating the gradation reference voltages for 256 grayscales according to the gamma correction characteristic. That is, the gradation reference voltage generation circuit 131 switches the value of the bottom potential VL applied to the ladder resistor LD1 from VBr to VBg within each horizontal scanning period to switch from the gamma correction characteristic of red to the gamma correction characteristic of green as shown in FIG. 4A. On the other hand, the gradation reference voltage generation circuit 132 switches the value of the bottom potential VL applied to the ladder resistor LD1 from VBb to VBg within each horizontal scanning period to switch from the gamma correction characteristic of blue to the gamma correction characteristic of green as shown in FIG. 4B.

Thus, the circuit scale can be reduced compared to the configuration using a dedicated gradation reference voltage generation circuit for each color (red, blue, green), that is, a configuration using three systems of gradation reference voltage generation circuits.

Furthermore, in the configuration shown in FIG. 5, one selected by the selector SEL from the amplified bottom potential VLr (VLb) obtained by amplifying the DC bottom potential VBr (VBb) for red (blue) of direct current using the input amplifier AM1 and the amplified bottom potential VLg obtained by amplifying the DC bottom potential VBg for green using the input amplifier AM2 is applied to the ladder resistor LD1 as the bottom potential VL.

Thus, since the DC bottom potentials (VBr, VBb, VBg) input to each of the input amplifiers AM1 and AM2 are constant regardless of the gamma characteristic switching signal SA, the response delay of each of the input amplifiers AM1 and AM2 is substantially zero. That is, the delay time required from the start of switching by the gamma characteristic switching signal SA to the stabilization of the value of the bottom potential VL output by the selector SEL is only the element delay of the selector SEL.

Thus, high-speed response becomes possible compared to a configuration in which the input amplifier is required at the rear stage of the selector SEL, that is, a delay time obtained by adding the response delay of the amplifier to the element delay of the selector SEL is required until the output of the input amplifier is stabilized after the start of switching.

Thus, according to the configuration shown in FIG. 5, power consumption can be reduced without causing image quality deterioration by suppressing the slew rate of the input amplifiers AM1 and AM2.

Second Embodiment

Figure 6:
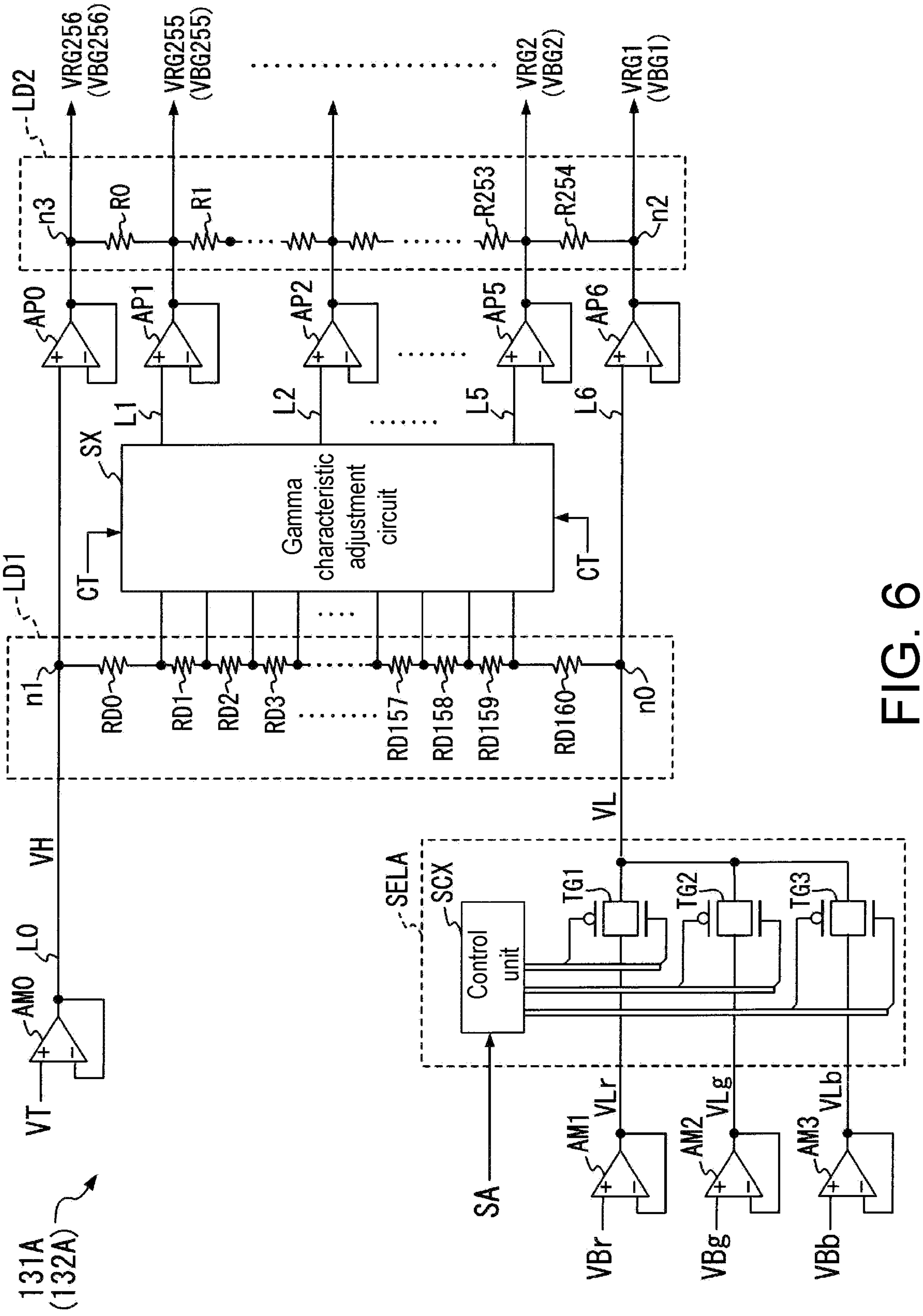
FIG. 6 is a circuit diagram showing an example of an internal configuration of a gradation reference voltage generation circuit 131A (132A) as another configuration of the gradation reference voltage generation circuit 131 (132).

FIG. 6 is a circuit diagram showing an internal configuration of gradation reference voltage generation circuits 131A and 132A as another configuration of the gradation reference voltage generation circuits 131 and 132 included in the gradation reference voltage generator 130.

In addition, in the configuration shown in FIG. 6, the other configurations except that a selector SELA is employed instead of the selector SEL and an input amplifier AM3 is newly added are the same as the internal configurations of the gradation reference voltage generation circuits 131 and 132 shown in FIG. 5.

Here, the configurations of the selector SELA and the input amplifier AM3 and the operations of the parts associated with the selector SELA and the input amplifier AM3 will be described below.

In FIG. 6, the input amplifier AM1 receives the DC bottom potential VBr for red having the lowest potential along the gamma correction characteristic of red and supplies a potential obtained by amplifying the DC bottom potential to the selector SELA as the amplified bottom potential VLr.

The input amplifier AM2 receives the DC bottom potential VBg for green having the lowest potential along the gamma correction characteristic of green and supplies a potential obtained by amplifying the DC bottom potential to the selector SELA as the amplified bottom potential VLg.

The input amplifier AM3 receives the DC bottom potential VBg for blue having the lowest potential along the gamma correction characteristic of blue and supplies a potential obtained by amplifying the DC bottom potential to the selector SELA as the amplified bottom potential VLg.

For example, as shown in FIG. 6, the selector SELA includes a control unit SCX and transmission gates TG1 to TG3.

The transmission gate TG1 receives the amplified bottom potential VLr and outputs the amplified bottom potential VLr to the line L6 as the bottom potential VL when the transmission gate is set to be in the on state by the control unit SCX. The transmission gate TG2 receives the amplified bottom potential VLg and outputs the amplified bottom potential VLg to the line L6 as the bottom potential VL when the transmission gate is set to be in the on state by the control unit SCX. The transmission gate TG3 receives the amplified bottom potential VLb and outputs the amplified bottom potential VLb to the line L6 as the bottom potential VL when the transmission gate is set to be in the on state by the control unit SCX.

The control unit SCX receives the gamma characteristic switching signal SA and sets one of the transmission gates TG1 to TG3 to be in the on state according to the gamma characteristic switching signal SA.

With such a configuration, the selector SELA selects one of the amplified bottom potential VLr corresponding to the lowest potential along the gamma correction characteristic of red, the amplified bottom potential VLg corresponding to the lowest potential along the gamma correction characteristic of green, and the amplified bottom potential VLb corresponding to the lowest potential along the gamma correction characteristic of blue according to the gamma characteristic switching signal SA. Then, the selector SEL sets one selected from the amplified bottom potentials VLr, VLg, and VLb as the bottom potential VL and supplies the selected one to one end n0 of the ladder resistor LD1 and the input terminal of the output amplifier AP6 via the line L6.

Figure 7A:
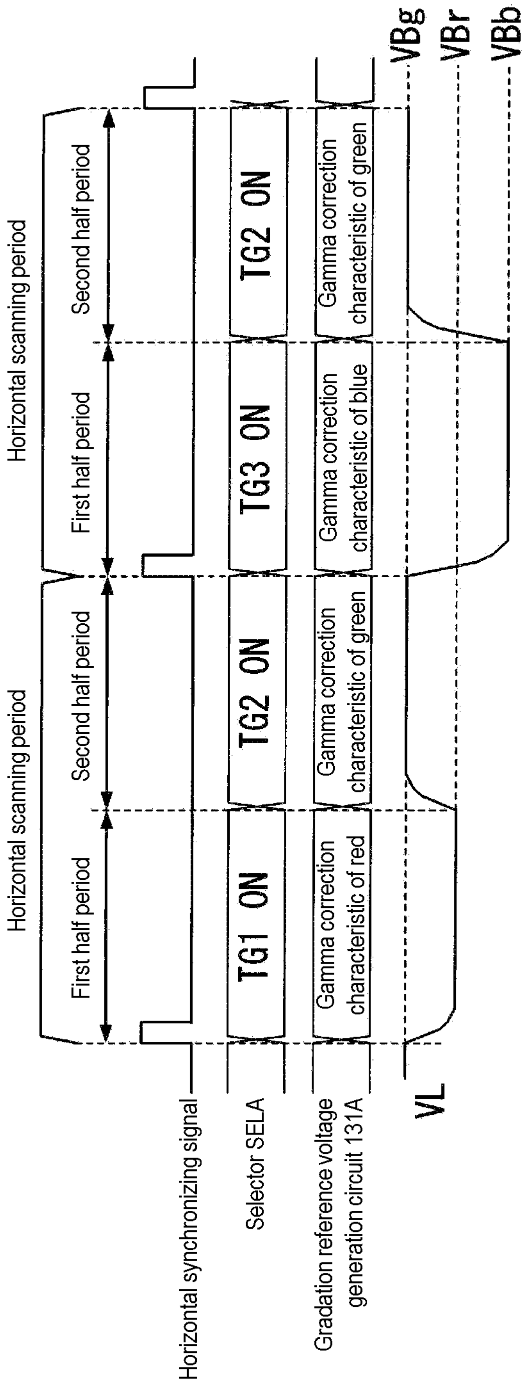
FIG. 7A is a time chart showing a switching operation of gamma correction characteristics in the gradation reference voltage generation circuit 131A.

Specifically, the control unit SCX of the gradation reference voltage generation circuit 131A sets one of the transmission gates TG1 to TG3 to be in the on state as below in each of the first half period and the second half period of each horizontal scanning period for each of two continuous horizontal scanning periods as shown in FIG. 7A.

First half period of leading horizontal scanning period: turn on TG1

Second half period of leading horizontal scanning period: turn on TG2

First half period of subsequent horizontal scanning period: turn on TG3

Second half period of subsequent horizontal scanning period: turn on TG2

Accordingly, in the gradation reference voltage generation circuit 131A, as shown in FIG. 7A, the value of the bottom potential VL applied to one end n0 of the ladder resistor LD1 is switched as below and hence the gamma correction characteristic of the gradation reference voltage generation circuit 131A is also switched as below.

Figure 7B:
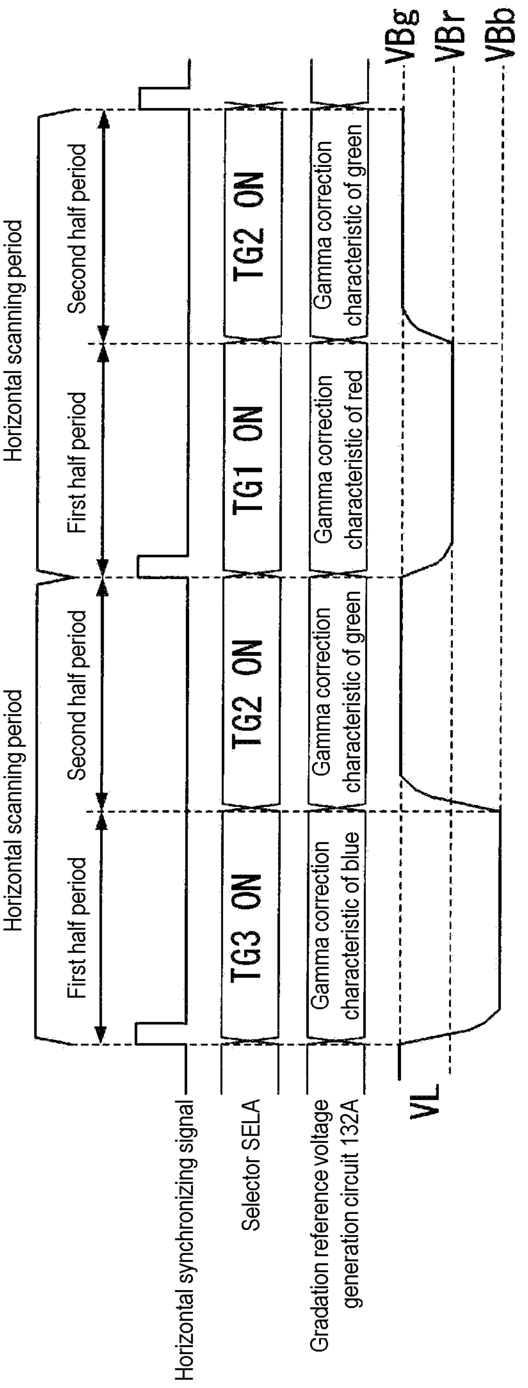
FIG. 7B is a time chart showing a switching operation of gamma correction characteristic in the gradation reference voltage generation circuit 132A.

First half period of leading horizontal scanning period: VBr, gamma correction characteristic of red Second half period of leading horizontal scanning period: VBg, gamma correction characteristic of green First half period of subsequent horizontal scanning period: VBb, gamma correction characteristic of blue Second half period of subsequent horizontal scanning period: VBg, gamma correction characteristic of green On the other hand, the control unit SCX of the gradation reference voltage generation circuit 132A sets one of the transmission gates TG1 to TG3 to be in the on state as below in each of the first half period and the second half period of each horizontal scanning period for each of two continuous horizontal scanning periods as shown in FIG. 7B.

First half period of leading horizontal scanning period: turn on TG3

Second half period of leading horizontal scanning period: turn on TG2

First half period of subsequent horizontal scanning period: turn on TG1

Second half period of subsequent horizontal scanning period: turn on TG2

Accordingly, in the gradation reference voltage generation circuit 132A, as shown in FIG. 7B, the value of the bottom potential VL applied to one end n0 of the ladder resistor LD1 is switched as below and hence the gamma correction characteristic of the gradation reference voltage generation circuit 132A is also switched as below.

First half period of leading horizontal scanning period: VBb, gamma correction characteristic of blue Second half period of leading horizontal scanning period: VBg, gamma correction characteristic of green First half period of subsequent horizontal scanning period: VBr, gamma correction characteristic of red Second half period of subsequent horizontal scanning period: VBg, gamma correction characteristic of green In this way, also in the gradation reference voltage generation circuits 131A and 132A shown in FIG. 6, a gradation reference voltage group for 256 grayscales along the gamma correction characteristic for each color (red, green, blue) can be generated by two systems of the gradation reference voltage generation circuits similarly to the gradation reference voltage generation circuits 131 and 132 shown in FIG. 3.

Thus, the circuit scale can be reduced compared to the configuration in which three systems of the gradation reference voltage generation circuits are used to generate the gradation reference voltage group for 256 grayscales along the gamma correction characteristic for each color.

Furthermore, in the configuration shown in FIG. 6, the amplified bottom potentials VLr, VLg, and VLb obtained by amplifying the DC bottom potentials VBr, VBg, and VBb for red, green, and blue of the direct current using the input amplifiers AM1 to AM3 are supplied to the selector SELA controlled by the gamma characteristic switching signal SA similarly to the configuration shown in FIG. 3.

Thus, since the DC bottom potentials VBr, VBb, and VBg input to each of the input amplifiers AM1 to AM3 are constant regardless of the gamma characteristic switching signal SA, the response delay of each of the input amplifiers AM1 to AM3 is substantially zero. That is, the delay time required from the start of switching by the gamma characteristic switching signal SA to the stabilization of the value of the bottom potential VL output by the selector SELA is only the element delay of the selector SELA.

Thus, high-speed response becomes possible compared to a configuration in which the input amplifier is required at the rear stage of the selector SELA, that is, a delay time obtained by adding the response delay of the amplifier to the element delay of the selector SEL is required until the output of the input amplifier is stabilized after the start of switching.

Thus, according to the configuration shown in FIG. 6, power consumption can be reduced without causing image quality deterioration by suppressing the slew rate of the input amplifiers AM1 to AM3.

In addition, the gradation reference voltage generator 130 including the gradation reference voltage generation circuit 131A shown in FIG. 6 can be applied to not only the data driver for driving the display panel having a pentile arrangement shown in FIG. 3 but also the data driver for driving the display panel having an RGB stripe arrangement.

Figure 8:
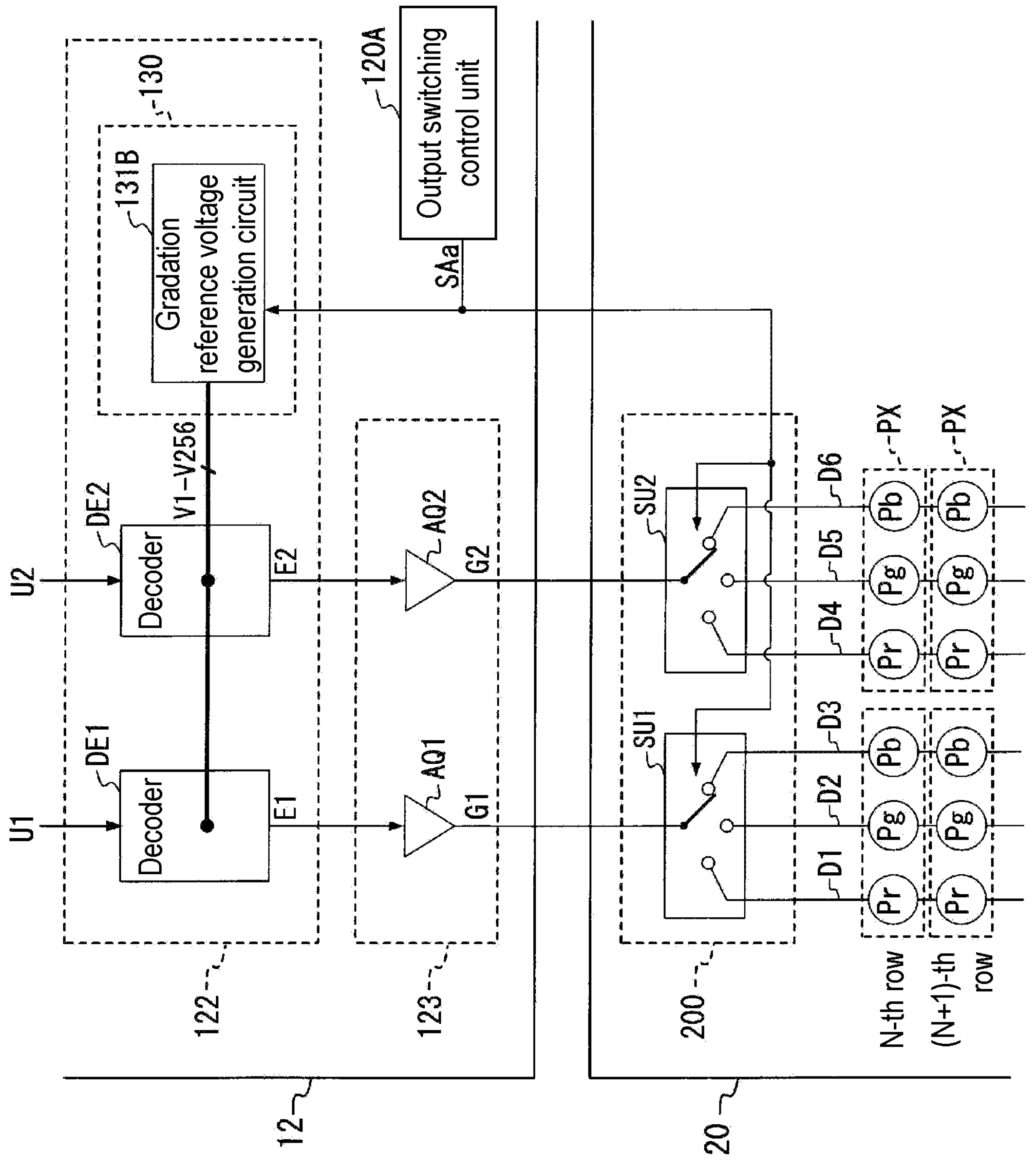
FIG. 8 is a block diagram showing an example of an internal configuration of the display panel 20 and the data driver 12 employed when driving the display panel 20 having an RGB stripe arrangement.

FIG. 8 is a block diagram showing an example of an internal configuration of the display panel 20 and the data driver 12 employed when driving the display panel 20 having an RGB stripe arrangement.

Additionally, in FIG. 8, for convenience of drawing, only the configuration related to two output channels corresponding to G1 and G2 out of the drive signals G1 to Gy of the data driver 12 is extracted and shown. That is, the configuration corresponding to each of y number of output channels is not included in the actual data driver 12 except for the output switching control unit 120A and the gradation reference voltage generator 130 shown in FIG. 8.

In FIG. 8, the gradation reference voltage generator 130 includes a gradation reference voltage generation circuit 131B which generates the gradation reference voltages V1 to V256 for 256 grayscales having voltage values along the gamma correction characteristic. The gradation reference voltage generation circuit 131B supplies the generated gradation reference voltages V1 to V256 to the decoders DE1 and DE2.

In addition, the gradation reference voltage generation circuit 131B switches the gamma correction characteristic in each horizontal scanning period according to a gamma characteristic switching signal SAa supplied from the output switching control unit 120A.

Figure 9:
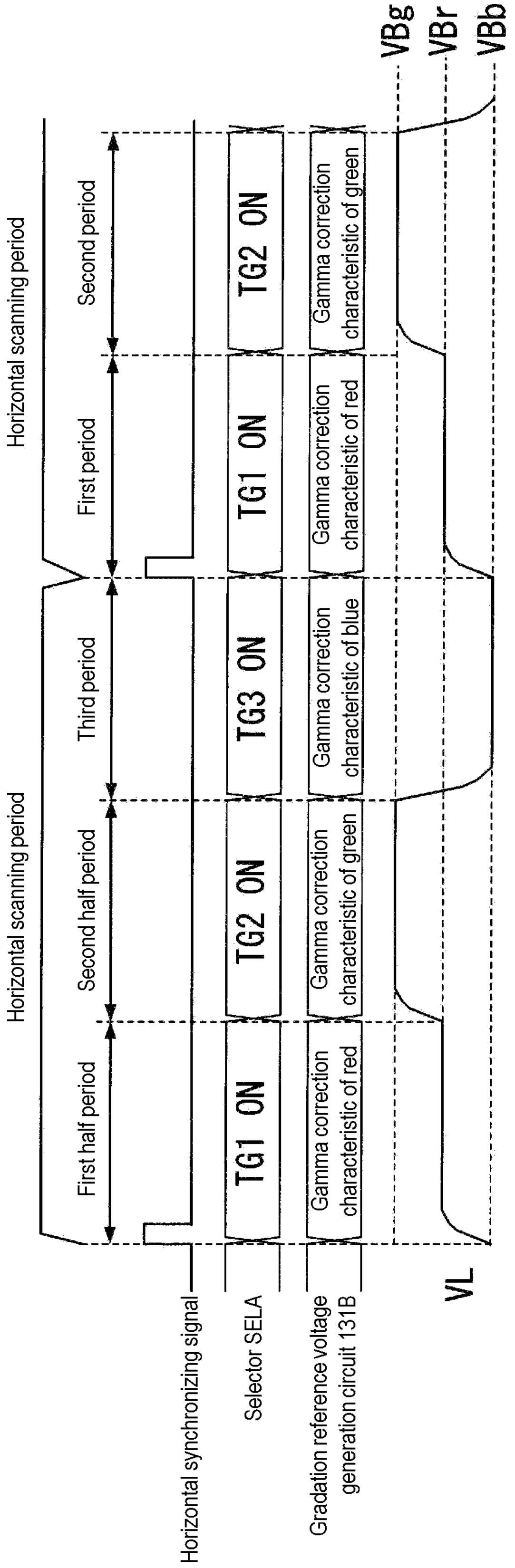
FIG. 9 is a time chart showing a switching operation of gamma correction characteristics in the gradation reference voltage generation circuit 131A shown in FIG. 7A.

For example, as shown in FIG. 9, each horizontal scanning period is divided into three periods, that is, the first to third periods and the gradation reference voltage generation circuit 131B generates the gradation reference voltages V1 to V256 along the gamma correction characteristic of red in the first period. Further, the gradation reference voltage generation circuit 131B generates the gradation reference voltages V1 to V256 along the gamma correction characteristic of green in the second period within each horizontal scanning period and generates the gradation reference voltages V1 to V256 along the gamma correction characteristic of blue in the third period.

The decoder DE1 selects the gradation reference voltage corresponding to the luminance level represented by the pixel data U1 from the gradation reference voltages V1 to V256 and supplies the gradation reference voltage to the output unit 123 as the gradation voltage E1. The decoder DE2 selects the gradation reference voltage corresponding to the luminance level represented by the pixel data U2 from the gradation reference voltages V1 to V256 and supplies the gradation reference voltage to the output unit 123 as the gradation voltage E2.

The output unit 123 includes amplifiers AQ1 and AQ2. The amplifier AQ1 receives the gradation voltage E1 and outputs a signal obtained by amplifying the gradation voltage to the display panel 20 as the drive signal G1. The amplifier AQ2 receives the gradation voltage E2 and outputs a signal obtained by amplifying the gradation voltage to the display panel 20 as the drive signal G2.

As shown in FIG. 8, switches SU1 and SU2 that individually receive the drive signals G1 and G2 together with the gamma characteristic switching signal SAa output from the data driver 12 are included in the demultiplexer unit 200 included in the display panel 20.

For example, the switch SU1 (SU2) supplies the drive signal G1 (G2) to the data line D1 (D4) of the display panel 20 in the first period within each horizontal scanning period shown in FIG. 9 based on the gamma characteristic switching signal SAa. Further, the switch SU1 (SU2) supplies the drive signal G1 (G2) to the data line D2 (D5) in the second period within each horizontal scanning period shown in FIG. 9. Further, the switch SU1 (SU2) supplies the drive signal G1 (G2) to the data line D3 (D6) in the third period within each horizontal scanning period shown in FIG. 9.

In addition, when the display panel 20 employs an RGB stripe arrangement, a group of the red display cells Pr are arranged in parallel in the data lines D1 and D4, a group of the green display cells Pg are arranged in parallel in the data lines D2 and D5, and a group of the green display cells Pg are arranged in parallel in the data lines D3 and D6. Here, in the RGB stripe arrangement, a cell group PX consisting of three adjacent display cells (Pr, Pg, Pb) on the horizontal scanning lines S1 to Sn constitute one color pixel.

Figure 10:
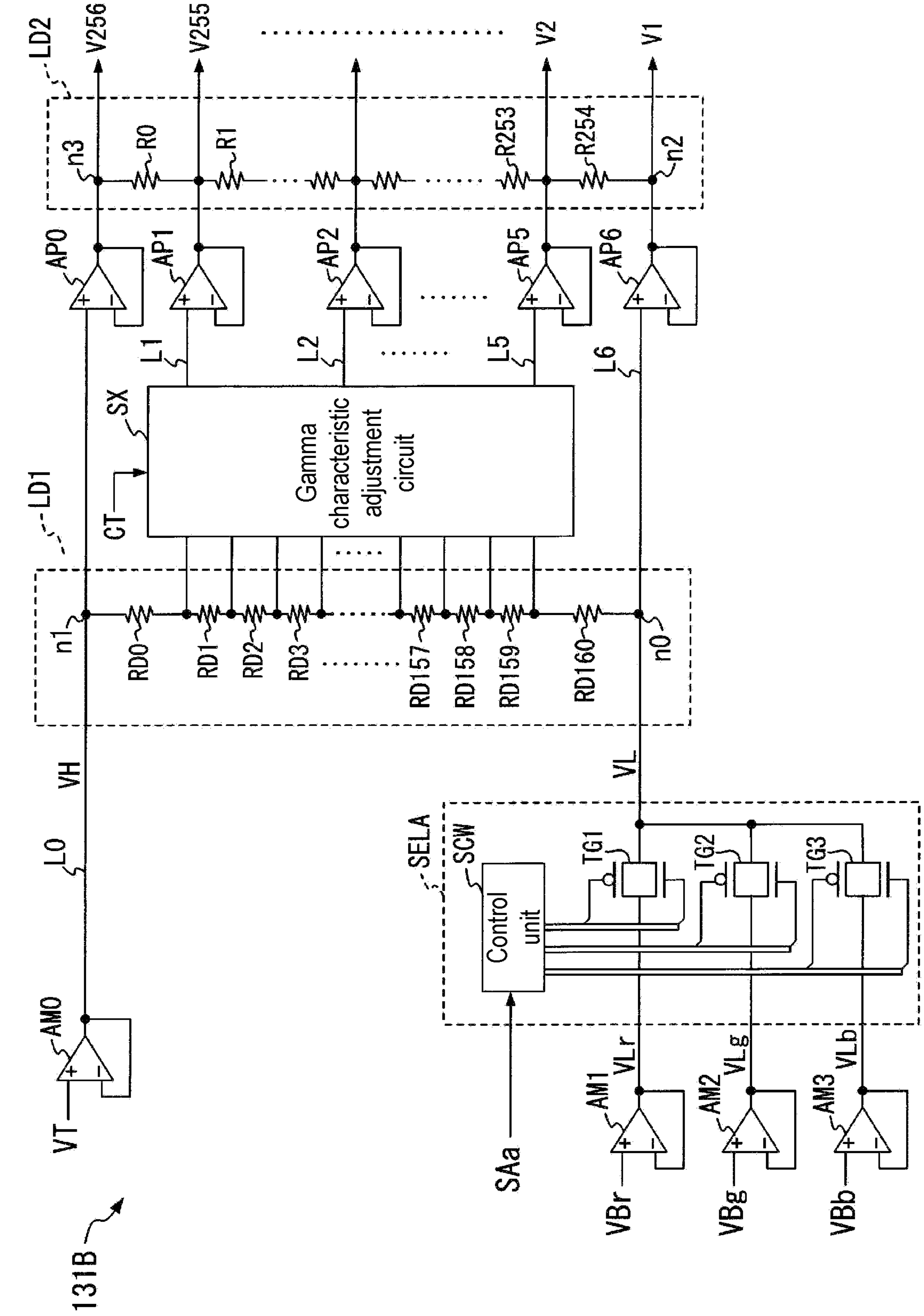
FIG. 10 is a circuit diagram showing an internal configuration of a gradation reference voltage generation circuit 131B.

FIG. 10 is a circuit diagram showing an internal configuration of the gradation reference voltage generation circuit 131B.

In addition, in the configuration shown in FIG. 10, the other configurations except that a control unit SCW is employed instead of the control unit SCX included in the selector SELA and the name of the gradation reference voltages VRG1 to VRG256 to be output is changed to the gradation reference voltages V1 to V256 are the same as those shown in FIG. 6.

Here, the operation of the control unit SCW will be described in detail below.

The control unit SCW receives the gamma characteristic switching signal SAa and sets one of the transmission gates TG1 to TG3 to be in the on state according to the gamma characteristic switching signal SAa.

Specifically, as shown in FIG. 9, the control unit SCW sets one of the transmission gates TG1 to TG3 to be in the on state as below in each of the first to third periods obtained by dividing each horizontal scanning period into three.

First period: turn on TG1

Second period: turn on TG2

Third period: turn on TG3

Accordingly, in the gradation reference voltage generation circuit 131B, as shown in FIG. 9, the value of the bottom potential VL applied to one end n0 of the ladder resistor LD1 and the gamma correction characteristic of the gradation reference voltage generation circuit 131B are changed as below.

First period: VBb, gamma correction characteristic of blue

Second period: VBg, gamma correction characteristic of green

Third period: VBr, gamma correction characteristic of red

Third Embodiment

Figure 11:
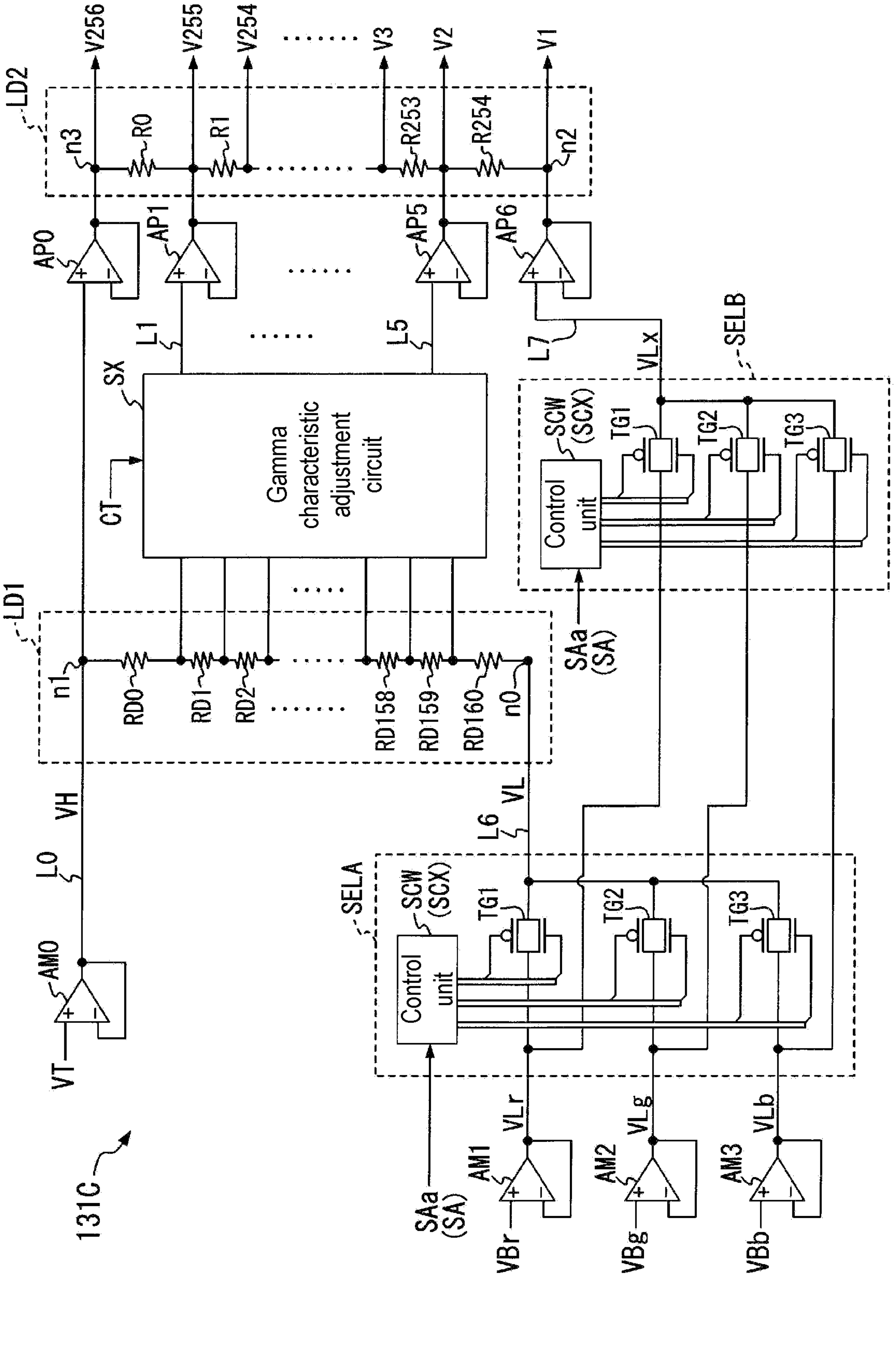
FIG. 11 is a circuit diagram showing an internal configuration of a gradation reference voltage generation circuit 131C as another configuration of the gradation reference voltage generation circuit (131A, 132A, 131B).

FIG. 11 is a circuit diagram showing an internal configuration of a gradation reference voltage generation circuit 131C as another configuration of the gradation reference voltage generation circuit (131A, 132A, 131B) shown in FIG. 6 or 10.

In addition, in the configuration shown in FIG. 11, the other configurations and the connection states except that a selector SELB is newly added, the output of the selector SELA is not connected to the output amplifier AP6, and the output of the selector SELB is connected to the output amplifier AP6 are the same as those shown in FIG. 6 or 10.

Here, the configuration of the selector SELB and the operation of the part associated with the selector SELB will be described below.

In FIG. 11, the input amplifier AM1 receives the DC bottom potential VBr for red having the lowest potential along the gamma correction characteristic of red and supplies a potential obtained by amplifying the DC bottom potential to the selectors SELA and SELB as the amplified bottom potential VLr.

The input amplifier AM2 receives the DC bottom potential VBg for green having the lowest potential along the gamma correction characteristic of green and supplies a potential obtained by amplifying the DC bottom potential to the selectors SELA and SELB as the amplified bottom potential VLg.

The input amplifier AM3 receives the DC bottom potential VBg for blue having the lowest potential along the gamma correction characteristic of blue and supplies a potential obtained by amplifying the DC bottom potential to the selectors SELA and SELB as the amplified bottom potential VLg.

The selector SELA includes the control unit SCW (SCX) and the transmission gates TG1 to TG3.

The transmission gate TG1 receives the amplified bottom potential VLr and applies the amplified bottom potential VLr to one end n0 of the ladder resistor LD1 via the line L6 by setting the amplified bottom potential VLr as the bottom potential VL when the transmission gate is set to be in the on state by the control unit SCW (SCX). The transmission gate TG2 receives the amplified bottom potential VLg and applies the amplified bottom potential VLg to one end of the resistor RD160 via the line L6 by setting the amplified bottom potential VLg as the bottom potential VL when the transmission gate is turned on by the control unit SCW (SCX). The transmission gate TG3 receives the amplified bottom potential VLb and applies the amplified bottom potential VLb to one end of the resistor RD160 via the line L6 by setting the amplified bottom potential VLb as the bottom potential VL when the transmission gate is set to be in the on state by the control unit SCW (SCX).

The control unit SCW (SCX) sequentially and selectively turns on the transmission gates TG1 to TG3 in the order shown in FIG. 9 (FIG. 7A, FIG. 7B) according to the gamma characteristic switching signal SAa (SA).

With such a configuration, the selector SELA selects one of the amplified bottom potential VLr corresponding to the lowest potential along the gamma correction characteristic of red, the amplified bottom potential VLg corresponding to the lowest potential along the gamma correction characteristic of green, and the amplified bottom potential VLb corresponding to the lowest potential along the gamma correction characteristic of blue according to the gamma characteristic switching signal SAa (SA). Then, the selector SELA sets one selected from the amplified bottom potentials VLr, VLg, and VLb as the bottom potential VL and supplies the selected one to one end n0 of the ladder resistor LD1 via the line L6.

The selector SELB has the same internal configuration as that of the selector SELA, that is, the control unit SCW (SCX) and the transmission gates TG1 to TG3. In the selector SELB, the amplified bottom potentials VLr, VLg, and VLb are respectively received by the transmission gates TG1 to TG3 similarly to the selector SELA. Further, the control unit SCW (SCX) of the selector SELB sequentially and selectively turns on the transmission gates TG1 to TG3 in the order shown in FIG. 9 (FIG. 7A, FIG. 7B) similarly to the control unit SCW (SCX) of the selector SELA.

However, in the selector SELB, one selected from the amplified bottom potentials VLr, VLg, and VLb is set as a bottom potential VLx and the selected one is applied to the input terminal of the output amplifier AP6 via the line L7. In addition, the output amplifier AP6 plays a role of applying a potential obtained by amplifying the bottom potential VLx to one end n2 of the ladder resistor LD2.

In this way, in the gradation reference voltage generation circuit 131C shown in FIG. 11, the amplified bottom potentials VLr, VLg, and VLb amplified by the input amplifiers AM1 to AM3 are respectively received by the selectors SELA and SELB having the same configuration and operated in the same way. That is, one of the amplified bottom potentials VLr, VLg, and VLb selected by each of the selectors SELA and SELB in accordance with the gamma characteristic switching signal SAa (SA) becomes the same. Here, one potential selected by the selector SELA is set as the bottom potential VL to be applied to the ladder resistor LD1 and the potential is applied to one end n0 of the ladder resistor LD1 via the line L6. Furthermore, one potential selected by the selector SELB is set as the bottom potential VLx to be applied to the ladder resistor LD2 and the potential is applied to one end n2 of the ladder resistor LD2 via the line L7 and the output amplifier AP6. In addition, the line L7 is electrically separated from the line L6.

According to such a configuration, VLr, VLg, or VLb amplified by the input amplifier (AM1, AM2, AM3) is directly applied to one end n2 of the ladder resistor LD2 via the output amplifier AP6 without passing through one end n0 of the ladder resistor LD1 as the bottom potential VLx.

Accordingly, a voltage generated on the line L6 by the ladder resistor LD1 and the on-resistor of the transmission gate TG1 (or TG2, TG3) is not superimposed on the bottom potential (VLx) to be applied to the ladder resistor LD2 as an error component with respect to the bottom potential VL.

Thus, according to the configuration shown in FIG. 11, it is possible to prevent image quality deterioration due to superimposition of the error component on the gradation reference voltage group (VRG1 to VRG256, VBG1 to VBG256, or V1 to V256) generated by the ladder resistor LD2.

In addition, in the first to third embodiments, although three colors, that is, red, green, and blue are used as the color components for the gamma correction characteristics, the disclosure is not limited to these three colors.

In short, the display driver that drives the display panel having the plurality of display cells respectively connected to the plurality of data lines based on the plurality of pixel data pieces representing the luminance levels represented by the video signals may include a gradation reference voltage generator and a DA conversion unit as below.

That is, the gradation reference voltage generator (130) generates a plurality of gradation reference voltages along the first to k-th (k is an integer of 2 or more) gamma correction characteristics for different color components. The DA conversion unit (122) selects the gradation reference voltage corresponding to the luminance level represented by the pixel data piece from the plurality of gradation reference voltages generated by the gradation reference voltage generator for each of the plurality of pixel data pieces and outputs the selected one as the gradation voltage.

Here, the gradation reference voltage generator includes first and second ladder resistors, first to k-the input amplifiers, and a first selector as below.

The first ladder resistor (LD1) receives the first potential (VL) at one end (n0) and receives the second potential (VH) higher than the first potential at the other end (n1) to generate a plurality of voltages obtained by dividing the voltage between the first and second potentials.

The second ladder resistor (LD2) receives the first potential (VL) at one end (n2), receives the second potential (VH) at the other end, and receives each of a plurality of partial voltages among a plurality of voltages generated by the first ladder resistor at a connection point between the own resistors to generate a plurality of gradation reference voltages.

The first to k-the input amplifiers (AM1 to AM3) receive the first to k-the DC bottom potentials (VBr, VBg, VBb) respectively corresponding to the first to k-the gamma correction characteristics and output the first to k-the amplified bottom potentials (VLr, VLg, VLb) obtained by individually amplifying the bottom potentials.

The first selector (SEL, SELA) receives the first to k-th amplified bottom potentials, sequentially selects one amplified bottom potential from the first to k-th amplified bottom potentials, and supplies the selected one amplified bottom potential to one end of the first ladder resistor as the first potential (VL).

What is claimed is:

1. A display driver for driving a display panel having a plurality of display cells respectively connected to a plurality of data lines based on a plurality of pixel data pieces representing a luminance level represented by a video signal, comprising:

a gradation reference voltage generator which generates a plurality of gradation reference voltages along first to k-th (k is an integer of 2 or more) gamma correction characteristics for different color components; and a DA conversion unit which selects a gradation reference voltage corresponding to a luminance level represented by the pixel data piece from the plurality of gradation reference voltages for each of the plurality of pixel data pieces and outputs the gradation reference voltage as a gradation voltage, wherein the gradation reference voltage generator includes a first ladder resistor which receives a first potential at one end and receives a second potential higher than the first potential at the other end to generate a plurality of voltages obtained by dividing a voltage between the first potential and the second potential, a second ladder resistor which receives the first potential at one end, receives the second potential at the other end, and receives each of a plurality of partial voltages among the plurality of voltages at a connection point between the resistors to generate the plurality of gradation reference voltages, first to k-th input amplifiers which receive first to k-th DC bottom potentials respectively corresponding to the first to k-th gamma correction characteristics, individually amplify the first to k-th DC bottom potentials, and output first to k-th amplified bottom potentials, and a first selector which receives the first to k-th amplified bottom potentials, sequentially selects one amplified bottom potential among the first to k-th amplified bottom potentials, and supplies the one selected amplified bottom potential to the one end of the first ladder resistor as the first potential.

2. The display driver according to claim 1, further comprising:

a second selector which receives the first to k-th amplified bottom potentials, sequentially selects one amplified bottom potential from the first to k-th amplified bottom potentials, and supplies the one selected amplified bottom potential to the one end of the second ladder resistor as the first potential.

3. The display driver according to claim 2, further comprising:

a switching control unit which controls the first selector and the second selector so that the one amplified bottom potential selected from the first to k-th amplified bottom potentials by the first selector and the second selector is switched to the other amplified bottom potential for each of a plurality of periods obtained by dividing each horizontal scanning period in the video signal.

4. The display driver according to claim 3, wherein the first amplified bottom potential selected from the first to k-th amplified bottom potentials by the second selector is the same as the first amplified bottom potential selected from the first to k-th amplified bottom potentials by the first selector.

5. The display driver according to claim 4, wherein a wiring that supplies the one amplified bottom potential selected by the first selector to one end of the first ladder resistor is electrically separated from a wiring that supplies the one amplified bottom potential selected by the second selector to one end of the second ladder resistor.

6. The display driver according to claim 3, wherein the k is 3, and wherein the first gamma correction characteristic is a gamma correction characteristic for a red component, the second gamma correction characteristic is a gamma correction characteristic for a green component, and the third gamma correction characteristic is a gamma correction characteristic for a blue component.

7. The display driver according to claim 2, wherein the first amplified bottom potential selected from the first to k-th amplified bottom potentials by the second selector is the same as the first amplified bottom potential selected from the first to k-th amplified bottom potentials by the first selector.

8. The display driver according to claim 7, wherein a wiring that supplies the one amplified bottom potential selected by the first selector to one end of the first ladder resistor is electrically separated from a wiring that supplies the one amplified bottom potential selected by the second selector to one end of the second ladder resistor.

9. The display driver according to claim 2, wherein the k is 3, and wherein the first gamma correction characteristic is a gamma correction characteristic for a red component, the second gamma correction characteristic is a gamma correction characteristic for a green component, and the third gamma correction characteristic is a gamma correction characteristic for a blue component.

10. The display driver according to claim 1, wherein the k is 3, and wherein the first gamma correction characteristic is a gamma correction characteristic for a red component, the second gamma correction characteristic is a gamma correction characteristic for a green component, and the third gamma correction characteristic is a gamma correction characteristic for a blue component.

11. A display device comprising:

a display panel in which a plurality of display cells are respectively connected to a plurality of data lines; and a display driver which drives the display panel based on a plurality of pixel data pieces representing a luminance level represented by a video signal, wherein the display driver includes a gradation reference voltage generator which generates a plurality of gradation reference voltages along first to k-th (k is an integer of 2 or more) gamma correction characteristics for different color components and a DA conversion unit which selects a gradation reference voltage corresponding to a luminance level represented by the pixel data piece from the plurality of gradation reference voltages for each of the plurality of pixel data pieces and outputs the gradation reference voltage as a gradation voltage, and wherein the gradation reference voltage generator includes a first ladder resistor which receives a first potential at one end and receives a second potential higher than the first potential at the other end to generate a plurality of voltages obtained by dividing a voltage between the first potential and the second potential, a second ladder resistor which receives the first potential at one end, receives the second potential at the other end, and receives each of a plurality of partial voltages among the plurality of voltages at a connection point between the resistors to generate the plurality of gradation reference voltages, first to k-th input amplifiers which receive first to k-th DC bottom potentials respectively corresponding to the first to k-th gamma correction characteristics, individually amplify the first to k-th DC bottom potentials, and output first to k-th amplified bottom potentials, and a first selector which receives the first to k-th amplified bottom potentials, sequentially selects one amplified bottom potential among the first to k-th amplified bottom potentials, and supplies the one selected amplified bottom potential to the one end of the first ladder resistor as the first potential.

* * * * *